United States Patent
Welter, Jr. et al.

[11] Patent Number: 5,903,638
[45] Date of Patent: May 11, 1999

[54] TELECOMMUNICATIONS SYSTEM FOR INTERNATIONAL CALL ROUTING USING TRAFFIC ALLOCATION

[75] Inventors: William G. Welter, Jr.; Louis G. Gottlieb, both of Colorado Springs, Colo.; Emery J. Reistetter, Scarsdale; Eva Marcus-Kantor, South Salem, both of N.Y.; Ronald J. Settele, Plano, Tex.

[73] Assignee: MCI Communications Corporation, Washington, D.C.

[21] Appl. No.: 08/736,644

[22] Filed: Oct. 25, 1996

Related U.S. Application Data

[63] Continuation of application No. 08/439,949, May 12, 1995, abandoned.

[51] Int. Cl.$^6$ .................... H04M 7/00; H04M 15/00
[52] U.S. Cl. .................. 379/220; 379/113; 379/115; 379/222; 379/230
[58] Field of Search .................... 379/113, 115, 379/207, 219, 220, 221, 222, 353, 229, 230

[56] References Cited

U.S. PATENT DOCUMENTS

| | | |
|---|---|---|
| 4,565,903 | 1/1986 | Riley ........................... 379/220 |
| 4,769,834 | 9/1988 | Billinger et al. ............... 379/221 |
| 4,866,763 | 9/1989 | Cooper et al. ................. 379/221 |
| 4,991,204 | 2/1991 | Yamamoto et al. ............. 379/221 |
| 5,063,592 | 11/1991 | Cannella et al. .............. 379/219 |
| 5,142,570 | 8/1992 | Chaudhary et al. ............ 379/221 |
| 5,239,542 | 8/1993 | Breidenstein et al. .......... 379/353 |
| 5,311,585 | 5/1994 | Armstrong et al. ............ 379/221 |
| 5,333,185 | 7/1994 | Burke et al. .................. 379/127 |
| 5,406,620 | 4/1995 | Pei ............................... 379/220 |

*Primary Examiner*—Harry S. Hong

[57] ABSTRACT

A telecommunications system for international routing processes international calls directed to a multi-carrier country. A network control system provides the intelligence needed to weigh all of the applicable information and, based on International Traffic Bid Allocation, returns the routing information to the long distance carrier domestic switch in accordance with an agreement on call allocation between the long distance carrier and the international carrier in the multi-carrier country. Based on the routing information provided by the network control system, the domestic switch subsequently routes the international call to the proper terminating gateway switch and the destination multi-carrier country.

13 Claims, 4 Drawing Sheets

TELECOMMUNICATIONS SYSTEM FOR INTERNATIONAL CALL ROUTING USING TRAFFIC ALLOCATION

This application is a continuation of U.S. patent application Ser. No. 08/439,949, filed May 12, 1995, now abandoned.

FIELD OF THE INVENTION

This invention relates to telecommunications systems and in particular to a telecommunications system for determining the proper routing for international calls.

BACKGROUND OF THE INVENTION

Outbound international telephone traffic is routed from the originating domestic switches to the gateway switches, which route the calls to international carriers in the destination country. If a domestic long distance carrier has agreements with more than one International Telecom Operator (ITO) in that country, the gateway switch routes the appropriate amount of outbound traffic to each ITO. The percentage of traffic sent to each ITO is embodied in the contractual agreement between the ITO and the domestic long distance carrier. These allocation percentages are enforced by the gateway switch, which divides the traffic among the ITOs in each country.

Enforcement of the allocation percentages within the gateway switch tables does not provide the required level of accuracy and flexibility to manage the increasingly complex network, services, and agreements. Currently, the gateway switches can not provide load balancing across the entire network of the domestic carrier. In addition, using the gateway switches does not provide the flexibility to efficiently manage different allocation percentages and/or overflow routing by call type.

Currently, to route international calls, the domestic switches recognize the country by the destination address, and utilize switch-based routing tables to determine the proper terminating trunk group to a gateway switch for this particular destination country. If the destination country is a single carrier country, this type of routing is sufficient. However, when a destination country has more than one service carrier, this type of routing does not provide the needed flexibility for proper allocation of the outbound international traffic.

A need therefore exists for a telecommunications system which allocates and routes international calls in accordance with availability of service provisions of an international carrier and an agreement between the long distance carrier and the international carrier.

OBJECTS OF THE INVENTION

It is therefore an object of the invention to provide a telecommunications system for routing international calls based on the agreement between the long distance carrier and the international carrier, and availability of service of the international carrier.

It is another object of the invention to provide a telecommunications system for accumulating information based on attributes, such as originating country, terminating country, etc., of an international call.

SUMMARY OF THE INVENTION

These and other objects, features, and advantages are accomplished by a telecommunications system for international routing.

The disclosed telecommunications system comprises a calling station, a switching office, a network control system (NCS) including a processor and a database, and a gateway switching office. The calling station originates an international telephone call which is routed to the switching office. The switching office, responding to the telephone number associated with the called station, sends a message to the network control system to request routing information for the international telephone call. The processor in the network control system accesses the database to determine the proper routing information based on the agreement between the long distance carrier and the international carrier. The NCS then returns a message, containing the routing information, to the switching office. Using this routing information, the switching office sends the telephone call to the gateway switching office for completing, via the international carrier, the communication with the called station in the destination country.

DESCRIPTION OF THE PREFERRED EMBODIMENTS

Prior to proceeding with the description of embodiments of the invention, some terms are defined below for easier understanding of the disclosed invention.

Multi-carrier country refers to a country that has more than one international telephone carrier. Destination traffic is usually divided between the international carriers in a multi-carrier country, but sometimes certain call types may be sent to only one international carrier in a multi-carrier country due to availability of service only from that international carrier.

Direct routing is a method of routing that directs a call to a certain destination switch and trunk group is associated with a particular carrier. In this application, the term means to send a call directly to an international carrier, because it is the only carrier in that country, or the only carrier in a multi-carrier country that can accept a certain call type(s). This may be based upon technical limitations of the carrier, or may be just a contractual agreement between that international carrier and the domestic long distance carrier.

International Traffic Bid Allocation (ITBA) is a method of determining the respective percentages of the calls to be routed to each international carrier in the multi-carrier country. The percentages are based upon contractual agreements between the international carriers and the domestic long distance carriers. For example, if a country has two carriers, and traffic is split 50/50, then carrier A gets 50 percent of the calls, and carrier B gets the other 50 percent of the calls. However, if the domestic long distance carrier sends all direct routed calls to carrier A, then the ITBA system must account for this situation and send more traffic to carrier B, so that the traffic volume allocation stays 50/50. In some countries, direct routed calls do not count within the ITBA percentages, so the completed traffic count must be checked to insure that the number of direct routed calls do not get counted when the ITBA-based system determines the percentages of calls directed to each carrier.

Figure 1:
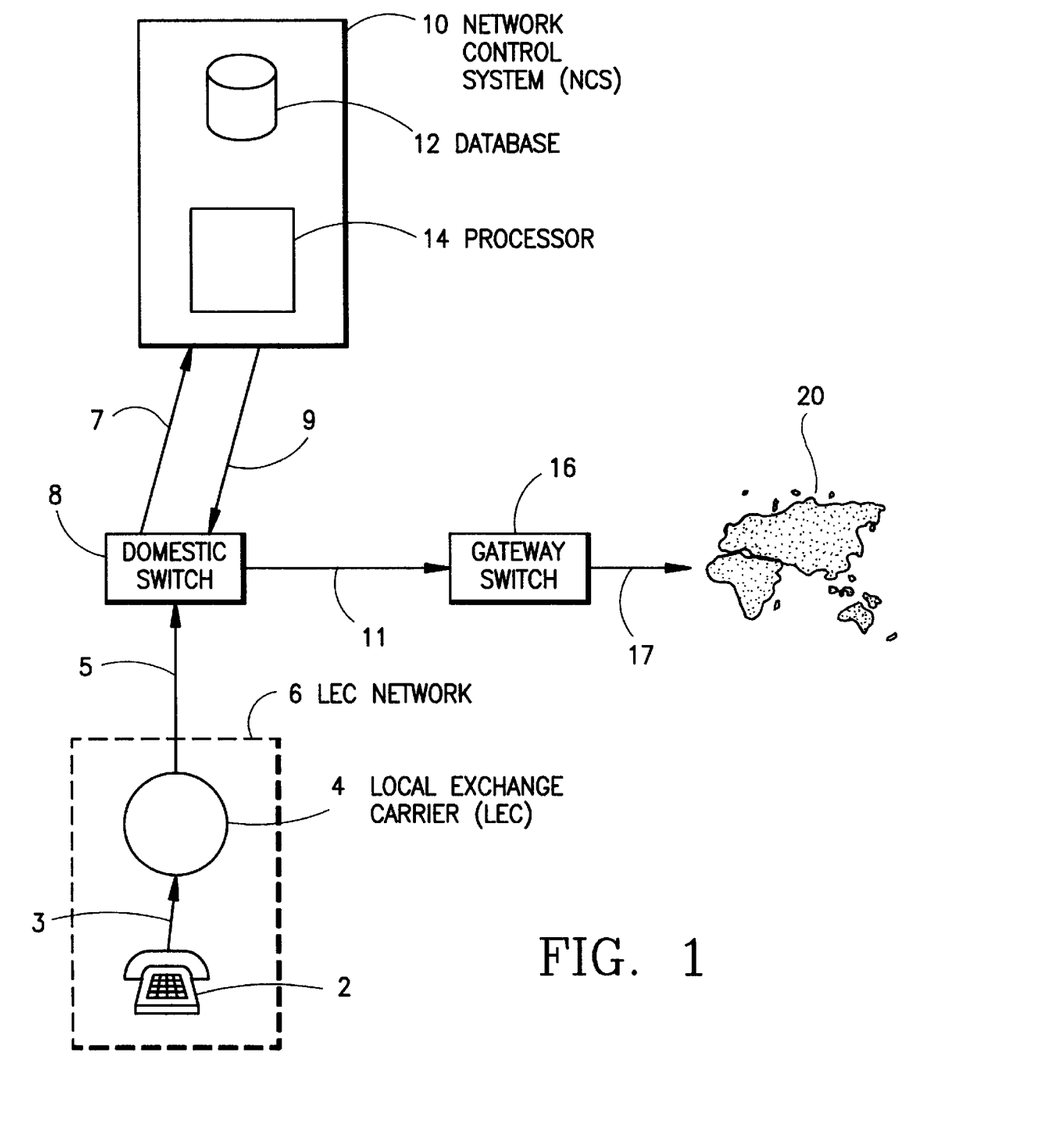
FIG. 1 is a block diagram of a telecommunications system for international routing of a telephone call.

A high level overview of one embodiment of the disclosed invention is shown in FIG. 1. Signaling information of a telephone call originated by a calling station 2 passes through a line 3 which connects the calling station 2 to a local exchange carrier (LEC) switching office 4 within LEC network 6. The signaling information then proceeds to a domestic switch 8 via a trunk 5. The domestic switch 8 uses its own internal tables to decide whether to query the NCS 10. As described above, certain call types do not require any decision making in routing to the gateway switch.

If the call type requires the inquiry to the NCS 10, the switch 8 sends a request message 7 to the NCS 10 via a data link using X.25 protocol. The request message 7 contains a request for the routing information for directing the call to an international carrier in accordance with the ITBA statistics.

The NCS 10, which includes a database 12 and a processor 14 controlling the database 12, responds with a response message 9 containing the routing information for the international carrier. The switch 8 then forwards the call to a gateway switch 16, via a trunk 11, which directs the call, via a trunk 17, to the selected international carrier in the Easter hemisphere 20, for example.

Figure 2:
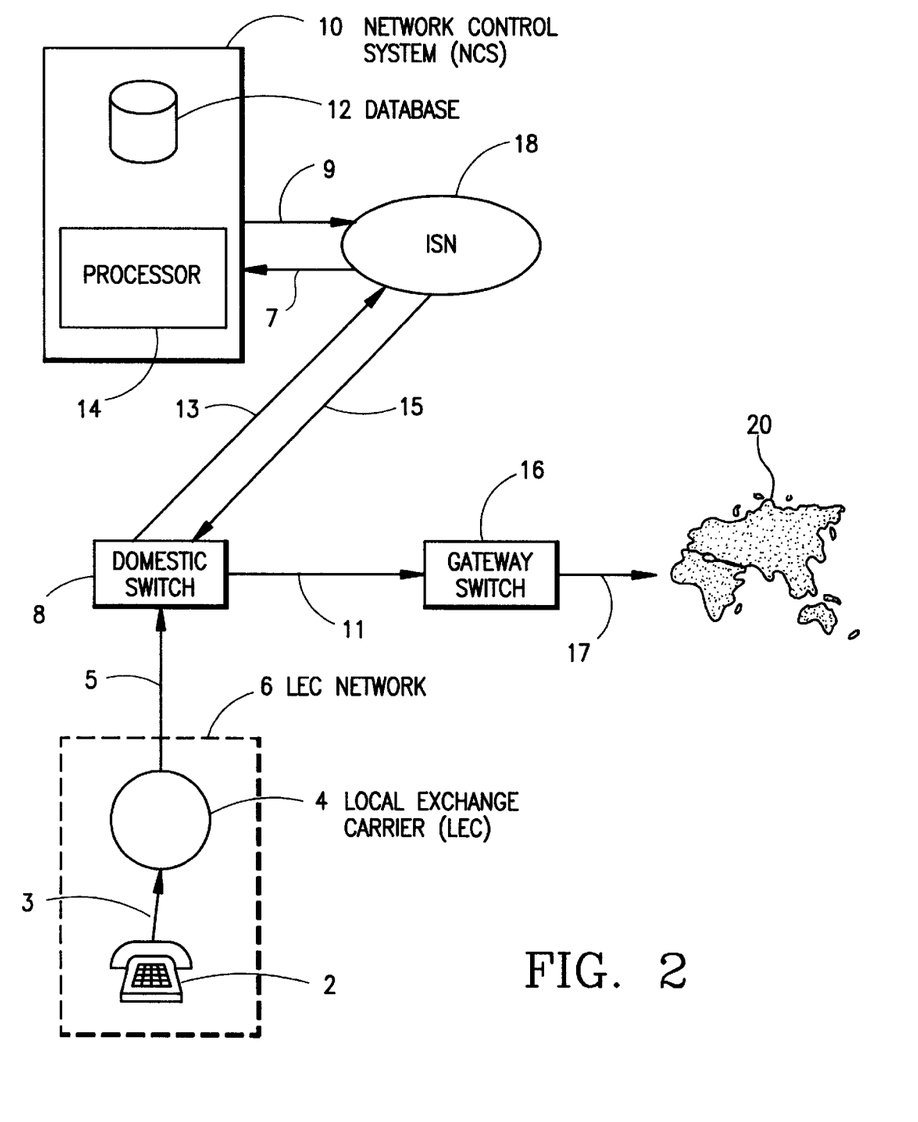
FIG. 2 is a block diagram of a telecommunications system for international routing of a telephone call using an operator assistance.

Another embodiment of the disclosed invention is shown in FIG. 2. In FIGS. 1 and 2, like reference numerals designate identical components of the disclosed invention. FIG. 2 illustrates the LEC network 6 comprising the calling station 2 and the LEC switching office 4. Similar to the processing in FIG. 1, the signaling information of the call proceeds from the calling station 2 to the domestic switch 8, via trunks 3 and 5, and the LEC switching office 4.

At the domestic switch 8, the signaling information of the call, identified as needing special assistance, is sent to an Intelligent Service Node (ISN) 18 via a trunk 13. The ISN 18 provides services for telephone calls requiring an operator assistance, such as collect calls, third party calls, credit card calls, etc. In formulating the request message 7, the ISN-processed call queries the NCS 10 for supplying the correct carrier recommendation.

Similar to the call processing of FIG. 1, the NCS 10, including the database 12 and the processor 14 which controls the database 12, responds with the response message 9 containing the routing information for the international carrier. The ISN 18 then forwards the routing information via a trunk 15 to the switch 8 which further routes the call to the gateway switch 16, via the trunk 11. The gateway switch 16 subsequently directs the call, via a trunk 17, to the selected international carrier in the Eastern hemisphere 20, for example.

Figure 3:
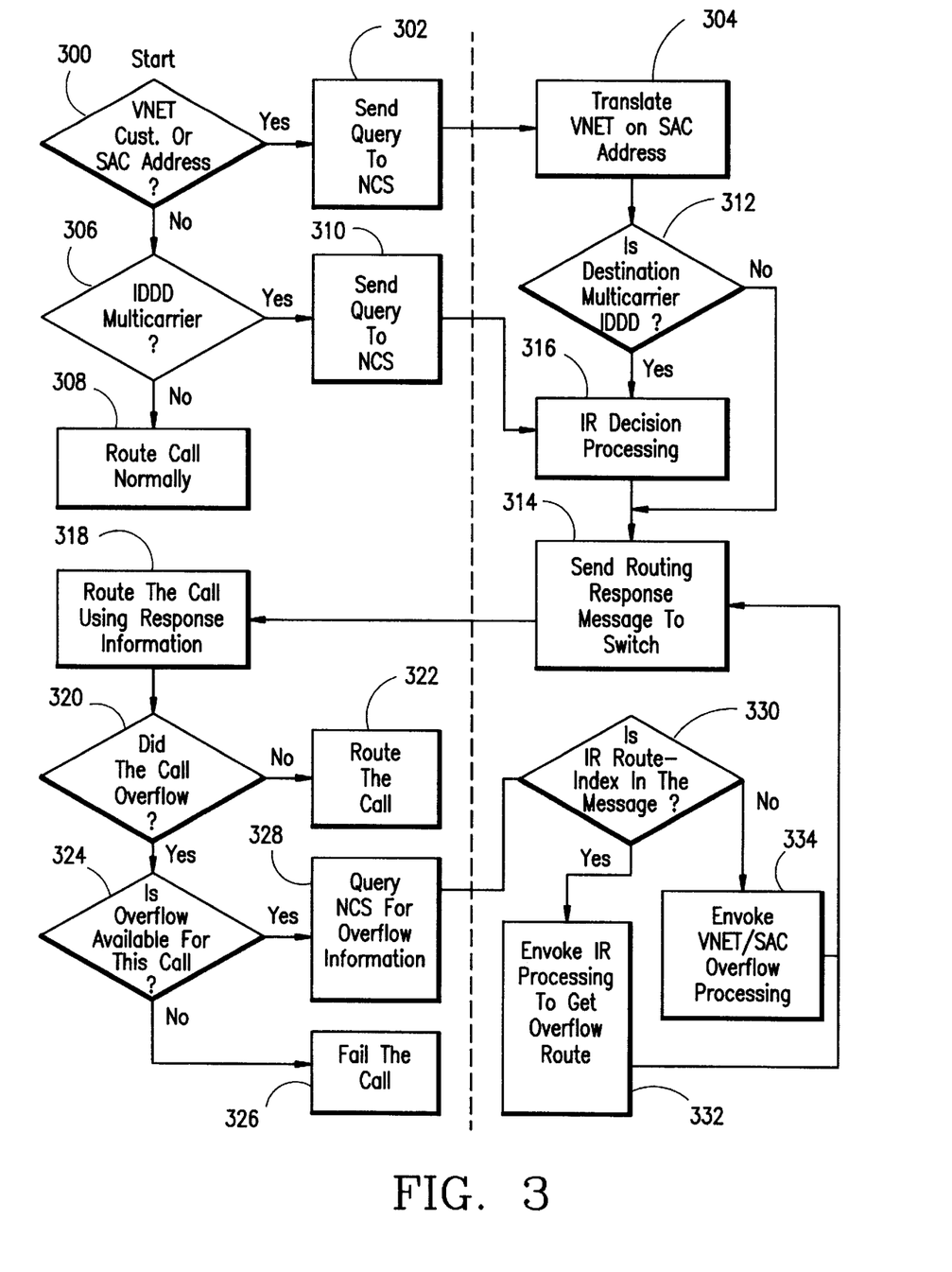
FIG. 3 is a sequencing flowchart for processing the international telephone call.

FIG. 3 is a sequencing flowchart for processing the international telephone call. When an international call is initiated from the calling station 2, the switch 8 receives signaling information from the LEC switching office 4, as described above. In step 300, the switch 8 then determines whether it is a Vnet® (Virtual private network) call or Special Access Code (SAC) call, such as 700, 800, or 900 calls. If the call is Vnet® or SAC, in step 302 the switch 8 sends the request message 7 to the NCS 10 which translates the dialed number into the corresponding IDDD number in step 304.

If the call is not Vnet® or SAC, the switch 8 checks whether the IDDD number is directed to a multi-carrier country, as shown in step 306. If the international country has only one carrier, then the call is routed to its destination in step 308. If, on the other hand, it is a multi-carrier country, the call is sent to the NCS 10 in step 310.

In step 312, for Vnet® or SAC calls, the NCS 10 checks whether the destination for the call is the multi-carrier country. If it is not, the response message 9 including the routing information is sent to the switch 8 in step 314.

The call to the multi-carrier country, regardless of the call type, i.e., Vnet®, SAC, or IDDD, is processed by the NCS 10 in step 316. The detailed description of the international routing (IR) processing will be described in detail later, with reference to FIG. 4.

After the IR processing, in step 314 the call is returned to the switch 8, which routes the call in step 318 according to the received information from the NCS 10. As shown in step 320, the switch 8 determines the availability of the terminating trunk from the gateway switch 16. The terminating trunk identification was included in the information supplied by the NCS 10. If the terminating trunk is available, the call is routed to its destination in step 322.

When the terminating trunk from the gateway switch 16 is filled to its capacity and cannot handle the call, in step 324 the switch 8 checks whether overflow processing is available for the international call. The overflow processing allows the switch 8 to query the NCS 10 for a different terminating switch/trunk combination to route the call to its destination. If the overflow processing is unavailable, the call is failed in step 326. Otherwise, another query is sent to the NCS 10 in step 328 for overflow information. In step 330, the NCS 10 checks the message for the type of overflow processing. If the overflow processing is for the international call, the NCS 10 invokes the IR processing for overflow in step 332, which is described below with reference to FIG. 4. For other types of calls, i.e., Vnet® or SAC, other overflow processing may be performed as shown in step 334.

Figure 4:
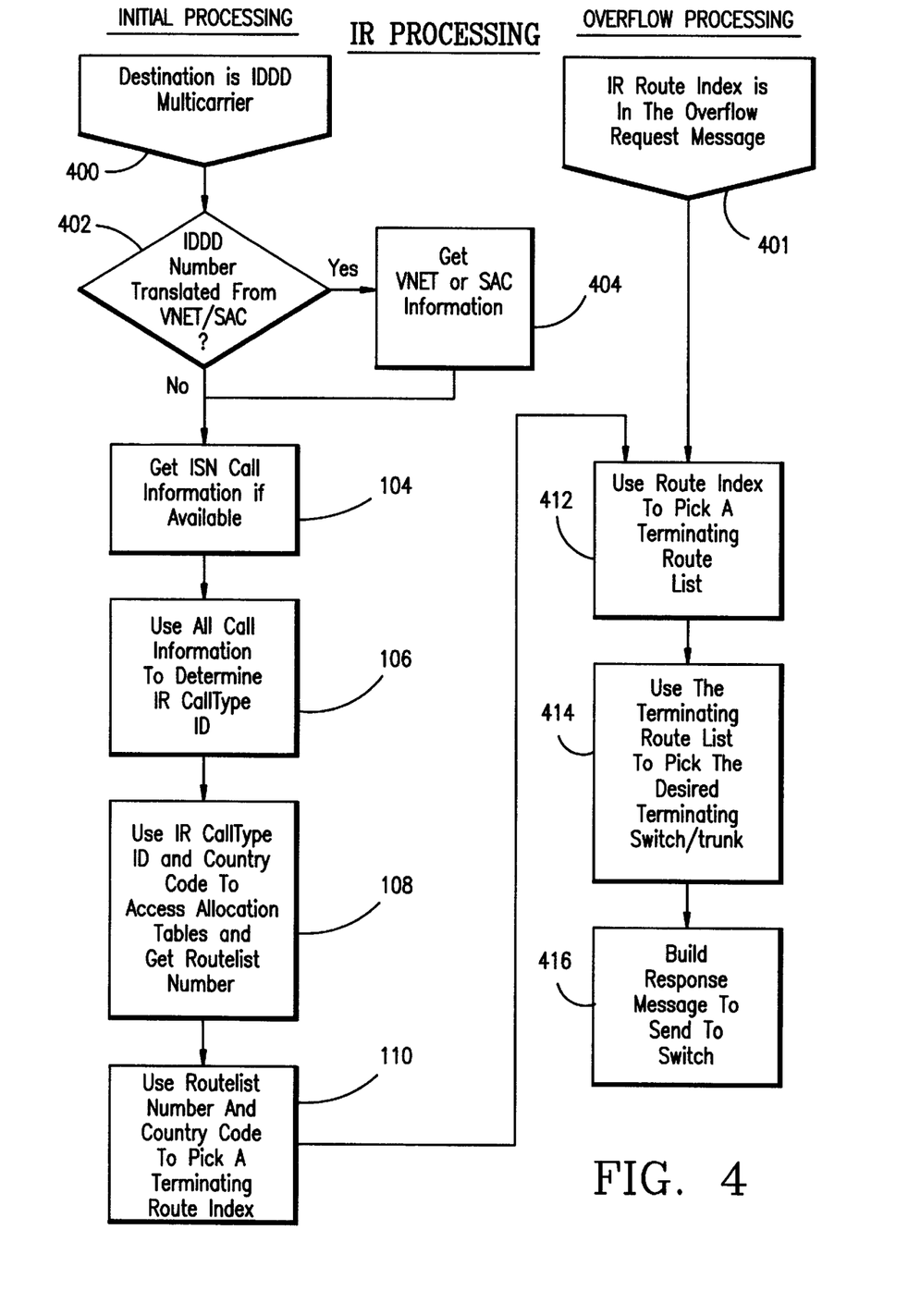
FIG. 4 is a detailed sequencing flowchart for the international routing processing.

FIG. 4 is a detailed sequencing flowchart for IR processing, as shown in steps 316 and 332 in FIG. 3. The initial processing designates the IR processing of step 316 in FIG. 3, and the overflow processing designates the IR processing of step 332 in FIG. 3.

Referring to FIG. 4, in the initial processing the NCS 10, having received the query for the multi-carrier country in step 400, determines whether the IDDD number was translated from Vnet® or SAC, as shown in step 402. If the number was translated in step 404 the NCS 10 retrieves the information, such as the dialed Vnet® or SAC number, which is needed for routing the call to the proper trunk.

In step 404, the ISN information, if applicable, is collected. All the information from the call is then used to access a table in the database 12 to obtain a Call Type ID in step 406. The Call Type ID, as well as the country code, are then used to obtain a Route List number from another table of the database 12 of the NCS 10, as shown in step 408. Based on the Route List number and the country code, the NCS 10 selects a terminating route index in step 410.

Starting with step 412, the processing is identical for both the overflow international calls and the initial processing of international calls. Thus, in step 412, the terminating route index, either provided in the request message from the switch 8 as shown in step 401, or from the previous step 410, is used to select the Terminating Route List table in the database 12, as shown in step 412. The Terminating Route List table provides the terminating switch/trunk group for terminating the call, as shown in step 414. In step 416, the response message is then sent to the switch 8 for routing the call.

As seen from FIGS. 1 and 2, the processor 14 of the NCS 10 makes the ITBA decision, while the NCS 10 can be accessed by the domestic switch 8, as well as the ISN 18. The processor 14 tracks all international traffic statistics and supplies the routing information for the correct destination carrier in order to honor all long distance carrier agreements for traffic delivery. The processor 14 also accumulates statistics regarding the number of calls which are routed to each carrier/country for all call types, and tracks the total number of calls per carrier/country. This allows the NCS 10 to make the proper routing recommendation based on the specific tables.

The NCS 10 contains all ITBA requirements, accomplishes the associated processing, and provides routing to the appropriate terminating international carrier. The NCS 10 provides information containing a switch ID/trunk group number, which is used to route the call to the gateway switch 16. After receiving the call, the gateway switch 16 then uses the trunk group number to access a trunk 17, as shown in FIGS. 1 and 2.

When the domestic switch 8 or the ISN 18 is instructed to access the NCS 10 for the routing information, the request message 7 is transmitted to the NCS 10 using X.25 protocol. A representative request message 7 may contain the following information shown in Table 1.

TABLE 1

| Parameter | Data/Meaning |
| --- | --- |
| Transaction Group Message Type | $09_{16}$ - Origination Screening |
| (Non-Vnet ® DAL Origination) | $EA_{16}$ - DAL Call Procedure Request |
| (Non-Vnet ® ANI Origination) | $E8_{16}$ - ONAT Call Procedure Request Message |
| Trunk Group Number | Originating Trunk Group |
| Switch ID | Originating Switch ID |
| Address Digits | |
| Nature of Call | 3 (National) |
| Destination Address | 4 (International) |
| | As Applicable |

After receiving the request message 7 from the domestic switch 8 or the ISN 18, the NCS 10 returns the response message 9 appropriate for this call, which may contain the following information for the domestic switch 8, as shown in Table 2.

TABLE 2

| Parameter | Data/Meaning |
| --- | --- |
| Message Type | E3 (Routing Response) |
| NCS Transaction ID | As Applicable |
| Action Code | 32 - Flex STC |
| | 33 - Flex STC - Overflow Allowed |
| Destination Switch ID | Destination Gateway or Domestic Switch |
| Terminating Trunk Group No. | Terminating Trunk Group |
| Subsequent Address | DDD or IDDD Terminating Address |

In the ISN-based system, two methods are used for processing calls at the ISN 18 via manual or automated operator intervention. The first method is a redirected call. After collecting and validating the destination address and other information, the ISN 18 requests routing information from the NCS 10. The ISN 18 then sends the called number, the card number if applicable, and the routing information back to the domestic switch 8 using Signaling System 7 protocol. The domestic switch 8 then completes the call.

The second method is a bridged call. After collecting and validating the destination address and other information, the domestic operator calls an international operator. After setting up the call through the international operator, the domestic operator bridges both legs of the call together and releases the call via a console command. In this method, the NCS 10 does not supply the address of the international carrier because the call is forwarded to the international operator.

In the first method, the ISN 18 queries the NCS 10 for applicable routing information after collecting the destination address and a card number, if applicable. The ISN 18 sends the request message 7 containing the following representative information to the NCS, shown in Table 3.

TABLE 3

| Parameter | Data/Meaning |
| --- | --- |
| Transaction Group | $09_{16}$ - Origination Screening |
| Message Type | $20_{16}$ - International Routing Request Message |
| Trunk Group | Originating Trunk Group |
| Switch ID | Originating switch ID |
| Address Digits | |
| Nature of Call | As Applicable |
| Destination Address | 3 (National) |
| | 4 (International) |
| Card Number | If Applicable |
| Entry Code | As Applicable |

The NCS 10 determines the call type and the appropriate routing recommendation, and passes the routing information back to the ISN 18. The ISN 18 passes the following information back to the domestic switch 8 using Signaling System 7 protocol for message passing. A sample message is shown in Table 4.

TABLE 4

| Parameter | Data/Meaning |
| --- | --- |
| Generic Digits (10101) | Destination Switch ID/Trunk Group |
| Called Party Number | As Applicable |
| Number | 000 0011 (National) |
| Nature of Address | 000 0100 (International) |
| Pre-translated Digits | As Applicable |
| Number | 000 0001 (Private) |
| Nature of Address | 000 0011 (National) |
| | 000 0100 (International) |
| Action Code | 32 - Flex STC |
| | 33 - Flex STC - Overflow Allowed |
| Entry Code | As Applicable |

The domestic switch 8 receives the destination switch ID and terminating trunk group in the response message 9 received from the NCS 10. The destination switch ID and terminating trunk group are passed to the gateway switch 16 in the generic digits parameter of the Signaling System 7 protocol. After receiving the call from the domestic switch 8, the gateway switch 16 checks the destination switch ID. If the destination switch ID matches its own ID, the gateway switch 16 attempts to route the call to the specified international carrier. If unable to route the call to the specified carrier, the gateway switch 16 sends a release message using Signaling System 7 protocol, which contains the appropriate release code, back to the domestic switch 8.

The NCS 10 uses the international routing process to determine call type, check allocation percentage totals, and decide which carrier should process the call. This initial international routing process is only needed once per call.

The NCS 10 returns information which indicates the country code, call type and route index to the domestic switch 8 or the ISN 18.

The NCS 10 performs the following basic steps during international routing processing.

(1) Receives the call information from the domestic switch 8 or the ISN 18.

(2) Assigns a call type ID based on the received call information.

(3) Uses the call type ID to access the ITBA.

(4) Decides which carrier will process the call.

(5) Looks up the routing information (destination switch ID and terminating trunk group).

(6) Returns the necessary routing information back to the domestic switch 8 or the group ISN 18.

The NCS 10 assigns the call type using information received from the switch 8 or the ISN 18. Each call type has certain characteristics which are used by the NCS 10 to assign a call type ID number. Listed below are typical characteristics for a representative selection of call types. It is understood, however, that the call types and their characteristics listed below are merely examples, and other combinations and arrangements may be equally employed in the disclosed invention.

Call Type Characteristics
SAC Origination ID (0–31):
   0=Not Used
   1=SAC 500-NXX-XXXX Address Dialed
   2=SAC 700-NXX-XXXX Address Dialed
   3=SAC 800-NXX-XXXX Address Dialed
   4=SAC 900-NXX-XXXX Address Dialed
   5=SAC 195-NXX-XXXX Address Dialed
   6–31=Not Assigned
Operator Services ID:
Connection Type (0–7):
   0=Not Used
   1=Station-Station (Entry Codes 2,5)
   2=Person-Person (Entry Codes 1,4,15)
   3–7=Not Used
Sent Type (0–7):
   0=Not Used
   1=Sent Paid (Entry Codes 1,2,6,9,10,11,13,15,48,50, 80–99)
   2=Collect (Entry Codes 4,5)
   3–7=Not Used
Assistance Type (0–7):
   0=Not Used
   1=Directory Asst. (Entry Code 12)
   2=General Asst. (Entry Code 8)
   3–7=Not Used
Operator-Operator Info (0–7):
   0=Not Used
   1=Call Transferred From Domestic Operator To International Operator
   2–7=Not Used
Vnet® Identifier (0/1):
   0=Basic Customer (Non-Vnet®)
   1=Vnet® Customer
Translation Info (0–7):
   ICCN Issuer: 6 or 7 characters in the format: 89XXXYY Data Rate ID (0–31):
   0=Voice
   1=1×64 Data
   2=2×64 Data
   30=30×64 Data
   31=Not Used The call type characteristics are used in the Call Type Table to assign a Call Type ID. The NCS 10 tries to match the call type characteristics of the call with the entries in the table in order to determine the Call Type ID. Table 5 shows a representative Call Type Table, based on the above list, with the corresponding characteristics arbitrarily to the call.

TABLE 5

| SAC ID | Operator Services ID | | | | Vnet® Cust. | Translation Info | Dat Rate ID | Call Type ID |
|---|---|---|---|---|---|---|---|---|
| | Conn. | Sent | Asst. | Op-Op | | | | |
| 3 | 0 | 0 | 0 | 0 | 0 | 1 | 0 | 001 |
| 0 | 0 | 0 | 0 | 0 | 1 | 2 | 0 | 002 |
| 0 | 0 | 0 | 0 | 0 | 1 | 2 | 6 | 003 |
| 0 | 2 | 2 | 0 | 0 | 0 | 0 | 0 | 004 |
| 0 | 0 | 0 | 0 | 0 | 1 | 1 | 0 | 005 |
| | | | | | | | | ... |
| | | | | | | | | 220 |

If there is a match for all call type characteristics, a Call Type ID is assigned to the call, as shown in the right-most column of the Table. If an exact match is not found for the call type characteristics, a default Call Type ID is assigned, such as 220.

Once the Call Type ID is determined, the processor 14 accesses the Call Type Route List Table based on the determined Call Type ID. The Call Type Route List Table contains the appropriate allocation and route list for this particular country. This table includes bid allocation percentages for the terminating carriers, as shown in Table 6.

TABLE 6

| Call Type Index | Allocation Percentage | Counts As A Bid | Carrier ID | Route Index | Terminating Route List |
|---|---|---|---|---|---|
| 001 | 37 | Y | 002 | 027 | 1234 |
| | 63 | N | 027 | 873 | 2222 |
| 221 | 100 | Y | 002 | 017 | 1234 |
| 245 | 50 | Y | 031 | 055 | 2222 |
| | 50 | Y | 009 | 054 | 1234 |

Call Type Index: This index is a Call Type ID, determined in the previous table, and is used to access the routing for this particular Call Type.

Allocation Percentage: This percentage supports a 1% granularity. The NCS 10 tracks the number of calls that use this Call Type ID, so the proper decision can be made.

Counts As A Bid: The NCS 10 keeps running totals of call counts for each country:

1. The total number of calls to each country.

2. The total number of calls which were directed to this particular call type/route index and allows the long distance carrier to track the number of calls that constitute "Bid" to a carrier. If a call is routed through a Call Type ID and Route Index which has this flag set, the count for the "Bid Carrier ID" will be incremented by 1.

Carrier ID: This index is used to increment statistics for the carrier which is referenced by the Terminating Route List. Since there may be a number of route lists associated with a particular carrier, this indicator is needed to enable the NCS 10 to track the number of calls that were originally "Bid" to a particular carrier.

Route Index: This index, in combination with a country code, is used to select a Terminating Route List.

Terminating Route List: This is the route list utilized for routing and indexing into the Route List Table.

Once the terminating route list has been determined, the processor 14 accesses the Route List Table based on the terminating route list from the previous table, to determine the actual route choice for this call. The route list is carrier specific, and the route choices in each route list indicate the destination terminating switch ID and route case number used for this call.

TABLE 7

| Route List | Admin. Information | Route #1 | Route #2 | Route #3 | Route #4 |
|---|---|---|---|---|---|
| 1111 | BT - England | 333–0987 | 334–6565 | 222–4444 | 226–1234 |
| 1234 | Mercury - England | 333–1091 | 333–1092 | 333–1094 | 334–9765 |
| 2222 | C & W - Japan | 222–1056 | 222–1057 | 222–1058 | N/A |

Administrative Information is typically used only by database personnel and indicates to which carrier this route list belongs. Route#1, Route#2, etc., in the "Switch ID/Trunk Group" format XXX-YYYY, are sent back in the response message 9 to the domestic switch 8. The domestic switch 8 sends the information to the Gateway switch 16, which uses it to route the call to the destination carrier/country.

Although specific embodiments were shown in Tables 1–6, other combinations and arrangements of call types and factors may be equally used in the disclosed invention.

Since those skilled in the art can modify the disclosed specific embodiment without departing from the spirit of the invention, it is, therefore, intended that the claims be interpreted to cover such modifications and equivalents.

What is claimed is:

1. A telecommunications system in a telephone network of a long distance carrier for routing an international telephone call to an international carrier in a destination country, said system comprising:
    a calling station for originating said international telephone call to a called station in said destination country;
    a switching office connected to said calling station and responsive to said international telephone call routed from said calling station;
    a network control system connected to said switching office for selecting said international carrier based on the call type of said international telephone call, wherein said network control system includes at least one database and processing means; and
    a gateway switching office connected to said switching office, said gateway switching office being responsive to routing information for said international telephone call from said network control system for routing said telephone call to said called station via said international carrier.

2. The telecommunications system according to claim 1, wherein said call type of said international telephone call includes at least one of the following: Vnet®, special access code and international direct distance dialing.

3. The telecommunications system according to claim 1, wherein said processing means includes programming means to (a) obtain a call type identification (ID) number from a first table based on call type characteristics of said international telephone call;
    (b) determine a terminating route list from a second table based on said call type ID number of said international telephone call; and
    (c) determine said routing information for selecting said international carrier from a third table based on said terminating route list, wherein said first, second, and third tables are located in said database.

4. The telecommunications system according to claim 1, wherein said network control system updates the routing information in said database after each international call allocation.

5. The telecommunications system according to claim 1, further comprising an overflow processor to obtain different routing information if said international carrier is unavailable to process said international telephone call.

6. A telecommunications system in a telephone network of a long distance carrier for routing an international telephone call to an international carrier in a destination country, said system comprising:
    a calling station for originating said international telephone call to a called station in said destination country;
    a switching office connected to said calling station and responsive to said international telephone call routed from said calling station;
    a service node connected to said switching office for providing operator assistance for said international telephone call;
    a network control system connected to said service node for selecting said international carrier based on the call type of said international telephone call, wherein said network control system includes at least one database and processing means; and
    a gateway switching office connected to said switching office, said gateway switching office being responsive to routing information for said international telephone call from said network control system sent via said service node and said switching office for routing said telephone call to said called station via said international carrier.

7. The telecommunications system according to claim 6, wherein said call type of said international telephone call includes at least one of the following: Vaet®, special access code, and international direct distance dialing.

8. The telecommunications system according to claim 6, wherein said processing means includes programming means to (a) obtain a call type identification (ID) number from a first table based on call type characteristics of said international telephone call;
    (b) determine a terminating route list from a second table based on said call type ID number of said international telephone call; and
    (c) determine said routing information for selecting said international carrier from a third table based on said terminating route list, wherein said first, second, and third tables are located in said database.

9. The telecommunications system according to claim 6, wherein said network control system updates the routing information in said database after each international call allocation.

10. The telecommunications system according to claim 6, further comprising an overflow processor to obtain different routing information if said international carrier is unavailable to process said international telephone call.

11. In a telephone network of a long distance carrier, a method for routing an international telephone call to an international carrier in a destination country, said method comprising the steps of:

originating said international telephone call from a calling station;

receiving at a switching office said international telephone call routed from said calling station;

sending a request message from said switching office to a network control system to determine routing information for said international telephone call;

selecting at said network control system said international carrier based on the call type of said international telephone call;

sending from said network control system to said switching office a response message including said routing information; and using said routing information at a gateway switching office to route said international telephone call to a called station in said destination country via said international carrier.

12. The method according to claim 11, further comprising the step of:

providing overflow processing to obtain different routing information for said international telephone call if said international carrier is unavailable to process said international telephone call.

13. The method according to claim 11, further comprising the step of: updating the routing information in said database after each international call allocation.

\* \* \* \* \*